(12) United States Patent
Breuninger

(10) Patent No.: US 7,704,487 B2
(45) Date of Patent: Apr. 27, 2010

(54) METHOD FOR THE SYNTHESIS OF ZEOLITE BETA WITH DIETHYLENETRIAMINE

(75) Inventor: Marcus Breuninger, Rosenheim (DE)

(73) Assignee: Süd-Chemie AG, München (DE)

( * ) Notice: Subject to any disclaimer, the term of this patent is extended or adjusted under 35 U.S.C. 154(b) by 554 days.

(21) Appl. No.: 11/718,337

(22) PCT Filed: Oct. 27, 2005

(86) PCT No.: PCT/EP2005/011517
§ 371 (c)(1), (2), (4) Date: May 1, 2007

(87) PCT Pub. No.: WO2006/050820
PCT Pub. Date: May 18, 2006

(65) Prior Publication Data
US 2008/0145310 A1    Jun. 19, 2008

(30) Foreign Application Priority Data
Nov. 12, 2004    (DE) .................. 10 2004 054 777

(51) Int. Cl.
*C01B 39/04*    (2006.01)
(52) U.S. Cl. .................................... 423/705
(58) Field of Classification Search ........... 423/705
See application file for complete search history.

(56) References Cited

U.S. PATENT DOCUMENTS

| | | | |
|---|---|---|---|
| 3,308,069 A | 3/1967 | Wadlinger | |
| 4,554,145 A | 11/1985 | Rubin | |
| 5,139,759 A | 8/1992 | Cannan | |
| 5,232,579 A | 8/1993 | Absil | |
| 6,923,949 B1 * | 8/2005 | Lai et al. | ............ 423/709 |

FOREIGN PATENT DOCUMENTS

| | | |
|---|---|---|
| EP | 0419334 | 3/1991 |
| EP | 0915056 A1 | 5/1999 |
| EP | 0955080 | 11/1999 |
| WO | WO0104051 A1 | 1/2001 |

OTHER PUBLICATIONS

Lin et al, "Ga2(DETA)(PO4)2.2H2O (DETA = Diethylenetriamine): A Novel Porous Gallium Phosphate Containing 24-Ring Channels", Journal of the American Chemical Society (2001) 123 (19), 4649-4650.*

Behrens, P., et al., "The Influence of Concentration on the Structure-directing Effects of Diethylenetriamine in the Synthesis of Porosils", Studies in Surface Science and Catalysis (2001), 135, pp. 447-455.

Szostak, R., Handbook of Molecular Sieves, Van Noostrand Rheinhold, New York, 1992, pp. 551-553.

* cited by examiner

*Primary Examiner*—David M Brunsman
(74) *Attorney, Agent, or Firm*—Scott R. Cox

(57) ABSTRACT

A method for the preparation of zeolite beta is described, the template used comprising diethylenetriamine. Furthermore, a zeolite beta obtainable thereby and the preferred use thereof are disclosed.

16 Claims, No Drawings

METHOD FOR THE SYNTHESIS OF ZEOLITE BETA WITH DIETHYLENETRIAMINE

This application is a 371 national stage entry of PCT/EP05/11517, filed Oct. 27, 2005.

The invention relates to a method for the preparation of zeolite beta, the structure-directing agents (templates) comprising diethylenetriamine. The zeolite beta obtained is suitable, inter alia, for the preparation of catalysts for hydrocarbon conversions and as an adsorbent.

The synthesis of zeolite beta with tetraethylammonium cations as structure-directing agents has long been known. Thus, U.S. Pat. No. 3,308,069 describes the synthesis of zeolite beta in the presence of tetraethylammonium hydroxide. The zeolite crystallizes at temperatures of from 75° C. to 200° C. from a mixture containing tetraethylammonium hydroxide and sources of $Na_2O$, $Al_2O_3$ and $SiO_2$.

In addition to tetraethylammonium cations, bicyclic compounds, such as, for example, 1,4-diazabicyclo[2.2.2]-octane (DABCO) have also been described as structure-directing agents for the synthesis of zeolite beta. U.S. Pat. No. 4,554,145 discloses the synthesis of zeolite beta with dibenzyl-1,4-diazabicyclo[2.2.2] octane chloride or hydroxide (dibenzyl-DABCO).

EP 0 419 334 A1 describes the synthesis of zeolite beta using a mixture of DABCO and methylamine as structure-directing agents.

U.S. Pat. No. 5,139,759 discloses the synthesis of zeolite beta with diethanolamine and a tetraethylammonium halide, preferably tetraethylammonium bromide.

U.S. Pat. No. 5,232,579 discloses the synthesis of zeolite beta in the form of large crystals using tertiary alkanolamines as nitrogen-containing chelate ligands and tetraethylammonium cations, such as, for example, the hydroxide or a halide. Triethanolamine, triisopropylamine and 2,2-bis(hydroxymethyl)-2,2',2''-nitrilotriethanol are mentioned as tertiary alkanolamines.

There is still a great need for alternative, simple and economical methods for the preparation of high-quality zeolite beta. An object of the present invention was therefore to provide such a method, which also avoids the disadvantages of the prior art.

This object is achieved by the method as claimed in claim 1. Preferred embodiments of the method according to the invention are contained in the subclaims.

The person skilled in the art is familiar with what is to be understood by a zeolite beta. A more detailed explanation is therefore not necessary here. For example, reference can be made to U.S. Pat. No. 3,308,069 and the description there of zeolite beta and to U.S. Pat. No. 5,139,759, column 1, lines 18 to 56. Stated briefly, zeolite beta consists of a three-dimensional pore system having 12-ring channels which are connected to one another. The linear channels run in two dimensions, through the common intersecting points of which helically wound 12-ring channels form in the third direction in space. The structure of zeolite beta is not uniform but varies between two end members, the so-called polymorphs A and B. The empirical formula of zeolite beta is, for example: y $Na^+[Al_ySi_{64-y}O_{128}]*n H_2O$, y being less than 7 (cf. also J. B. Higgins et al. Zeolites 8 (1988), 446-452).

Thus, within the scope of the present invention, it was surprisingly found that zeolite beta can be advantageously prepared if the structure-directing agents (templates) comprise diethylenetriamine (1,4,7-triazaheptane, dien). The discovery by the inventors that diethylenetriamine can be particularly advantageously used for the synthesis of zeolite beta is all the more unexpected since the synthesis methods which are described in the literature and use diethylene-triamine as a structure-directing agent give zeolite structures which firstly have no structural relationship with zeolite beta and secondly, if they were to occur as a foreign phase in a synthesis of zeolite beta, are very undesirable. These are, inter alia, ZSM-5 (MFI), ZSM-11 (MEL) and ZSM-48.

Thus, P. Behrens et al. (Studies in Surface Science and Catalysis, 135 (2001) 447-455) describe the structure-directing effect of diethylenetriamine on the synthesis of porosils. In the system x $(H_2NC_2H_4)_2NH$:0.8 $HF$:$SiO_2$:(10-x) $H_2O$, the proportion x of diethylenetriamine was varied in the range from 0.1 to 10. For x=10, the clathrasil nonasil was obtained after 120 days. In the range from x=7.5 to x=9, a mixture of nonasil and silicalite-1 (MFI) forms within 13 days. From x=7 to x=5, only MFI is formed, while ZSM-48 forms on further reduction of x, first with MFI as a foreign phase and as a pure phase at x=2. In the case of values of x<1 no crystalline phase is obtained. That diethylenetriamine, in addition to other nitrogen compounds, can be used as a structure-directing agent for the synthesis of ZSM-48 was already summarized by R. Szostak in "Handbook of Molecular Sieves", Van Noostrand Rheinhold, New York, 1992, pages 551-553. The synthesis of ZSM-5 and ZSM-11 using aliphatic amines as template is described in WO 2001/004051. In addition to diethylenetriamine, ethylamine, ethylenediamine, triethylenetetramine and tris(2-aminoethyl)amine are also mentioned as possible templates.

Methods for the preparation of zeolite beta are known as such to the person skilled in the art. In general, a reaction mixture consisting of at least one structure-directing agent (template), at least one silicon or silica source and at least one aluminum or alumina source is used thereby. Within the scope of the present invention, in general all silicon or silica sources and aluminum or alumina sources familiar to the person skilled in the art can be used. In general, for the preparation of the zeolite, a reaction mixture containing diethylenetriamine, optionally other templates, such as tetraethylammonium cations, a silica source and an aluminate source is prepared and this mixture is kept at elevated temperatures until crystals of zeolite beta have formed.

Examples of suitable silicon or silica sources are, without limitation, silicates, silica sols, silicic acid esters, precipitated silica or pyrogenic silica. Precipitated silica is preferred according to the invention.

Examples of suitable aluminum or alumina sources are, without limitation, aluminates, aluminas or aluminum hydroxides or aluminoxide trihydrate. Aluminates, such as sodium aluminate, are preferred according to the invention.

According to the invention, it is now essential that the structure-directing agents (templates) used for the synthesis of zeolite beta comprise at least diethylenetriamine. In addition to diethylenetriamine the templates known from the prior art and familiar to the person skilled in the art can be used.

According to a particularly preferred embodiment according to the invention, the diethylenetriamine (R') is used as a salt of the general empirical formula R'X, $R'X_2$ and/or $R'X_3$, X preferably being a halide, in particular bromide, or a hydroxide.

According to a particularly preferred embodiment, a template mixture which, in addition to diethylenetriamine, also contains tetraethylammonium cations or compounds containing them or substantially consists of these two components is used in the method according to the invention. Particularly preferred molar ratios of tetraethylammonium salt (R) and diethylenetriamine (R') are as follows: R/(R+R')=0.2 to 0.85. Particularly preferably, the template mixture used comprises more than 90% by weight, more preferably more than 95% by weight, more preferably at least 99% by weight, of at least one compound containing tetraethylammonium cations and diethylenetriamine. Particularly advantageous syntheses are permitted thereby.

Nonlimiting examples of suitable compounds containing tetra-ethylammonium cations are: tetraethylammonium hydroxide, tetraethylammonium bromide, tetraethylammonium chloride and tetraethylammonium fluoride and mixtures thereof. Usually, the tetraethylammonium cations are used in the form of hydroxide or bromide, the price of tetraethylammonium hydroxide being a multiple of the price of tetraethylammonium bromide. This makes syntheses based on tetraethylammonium bromide interesting on a commercial scale for the production of zeolite beta. A disadvantage of a synthesis route based on the bromide is the lower alkalinity of the reaction mixture due to the use of the acidic salt tetraethylammonium bromide. Without addition of a base, the pH of pH>10 required for the formulation of zeolite beta is not reached. An increase in the alkalinity by increased addition of, for example, sodium hydroxide leads to formation of undesired foreign phases, such as, for example, mordenite (MOR) and/or ZSM-5 (MFI), owing to the simultaneous increase in the Nat concentration.

Within the scope of the present invention, it was furthermore found that the diethylenetriamine in the reaction mixture can also ensure the necessary alkalinity or contribute thereto, i.e. less alkali or no alkali at all may need to be added. Furthermore, a particular advantage of the present invention is that less (expensive) tetraethylammonium cations are required than in the methods according to the prior art, so that considerable costs can be saved. As mentioned above, this is all the more surprising since, according to the prior art, diethylenetriamine promotes the formation of zeolite structures other than zeolite beta and, as described above, is used as a structure-directing agent for the synthesis of the zeolites ZSM-5, ZSM-11 and ZSM-48 and for Nonasil. These are all zeolites which are not structurally related to beta.

As mentioned above, in general any silicon or aluminum source familiar to the person skilled in the art can be used in the method according to the invention. The ratio of silicon to aluminum in the reaction mixture, calculated as $SiO_2/Al_2O_3$, is in general from about 10 to 400, in particular from 20 to 50. In individual cases, however, lower or higher $SiO_2/Al_2O_3$ ratios may also be advantageous.

According to a preferred invention, at least one compound having an alkali metal ion is also present in the reaction mixture. In some cases, however, it may also be advantageous completely to avoid the presence of alkali metal ions.

According to an embodiment according to the invention, the $M_2O/SiO_2$ ratio, where M is an alkali metal, is from about 0.001 to 0.1, in particular from 0.01 to 0.08. Furthermore, it is preferable according to the invention if M is sodium.

According to a preferred embodiment according to the invention, the $R_2O/SiO_2$ ratio, where R is a tetraethylammonium salt, is from about 0.04 to 0.5, in particular from 0.06 to 0.4.

Furthermore, it is preferable if the $R'/SiO_2$ ratio, where R' is diethylenetriamine, is from about 0.05 to 1 and preferably from about 0.1 to 0.5. Furthermore, it is preferable if, in the case of the reaction mixture used in the method according to the invention, the $H_2O/SiO_2$ ratio is from about 6 to 300, in particular from about 10 to 50.

According to a preferred embodiment, a reaction mixture having a composition, expressed as molar ratios, in the ranges:

| | |
|---|---|
| $SiO_2/Al_2O_3$ | from 10 to 400 |
| $M_2O/SiO_2$ | from 0.001 to 0.1 |
| $R_2O/SiO_2$ | from 0.04 to 0.5 |
| $R'/SiO_2$ | from 0.05 to 1 |
| $H_2O/SiO_2$ | from 8 to 300 | is used, in which R, R' and M have the above meanings. Particularly preferably, the reaction mixture has the following composition, expressed as molar ratios:

| | |
|---|---|
| $SiO_2/Al_2O_3$ | from 20 to 50 |
| $M_2O/SiO_2$ | from 0.01 to 0.08 |
| $R_2O/SiO_2$ | from 0.06 to 0.4 |
| $R'/SiO_2$ | from 0.1 to 0.5 |
| $H_2O/SiO_2$ | from 10 to 50 | in which R, R' and M are as defined above.

According to a further preferred embodiment according to the invention, the template mixture used also contains diethylene glycol (R") as a further cotemplate, in addition to at least diethylenetriamine and tetraethylammonium cations, or substantially or completely consists of the three compounds above. It is preferable if the $R''/SiO_2$ ratio is from about 0.05 to 1 and preferably from about 0.1 to 0.5. Furthermore, it is preferable if the molar R/(R+R'+R") ratio is from 0.2 to 0.8 and preferably R'/R" is from 0.1 to 2, in particular from 0.1 to 1. In principle, diethylenetriamine homologs, in particular compounds of the general formula $H_2N$—$(CH_2$—$CH_2$—$NH)_x$—$CH_2$—$CH_2$—$NH_2$, x being greater than 1, can also be used in addition to or instead of diethylenetriamine, but the best results are obtained with diethylenetriamine.

The reaction mixture according to the invention, containing at least the components as mentioned above, is then reacted in a manner familiar to the person skilled in the art for the formation of zeolite beta crystals.

The reaction of the reaction mixture can be carried out with or without stirring, preferably with constant stirring. In many cases, it is advantageous to carry out the reaction in a polypropylene, Teflon-coated or stainless steel autoclave. The reaction is preferably effected at elevated temperature, i.e. above room temperature, in order to promote the crystallization of zeolite beta. Preferred temperatures are from about 70° C. to 200° C., in particular from about 100° C. to 180° C.

The time required for the synthesis of zeolite crystals may vary within wide limits and of course depends, inter alia, on the other reaction conditions chosen, in particular the reaction temperature and the composition of the reaction mixture. In many cases, the reaction time is from several hours to several days, for example from about 16 hours to 90 days.

The reaction can be carried out at atmospheric pressure or, preferably, at elevated pressure, for example in the abovementioned autoclave.

According to a preferred embodiment according to the invention, seed crystals of zeolite beta may also be added to the reaction mixture in order to promote or to accelerate the formation of further crystals of zeolite beta in the reaction of the reaction mixture as described above.

The use of seed crystals (for example from earlier syntheses) is familiar as such to the person skilled in the art.

After the formation of the zeolite beta crystals, these can be separated off in a manner familiar to the person skilled in the art, for example by filtration or centrifuging.

The zeolite crystals thus obtained can be dried or calcined in a conventional manner, depending on the desired form and further use. By means of a calcination, the zeolite is converted into the hydrogen form and the template (mixture) is removed. The calcination can be carried out, for example, in air or an inert atmosphere at temperatures in the range from about 200° C. to 900° C. or higher.

According to a preferred embodiment according to the invention, M and/or R and/or R' can be exchanged completely or partly for hydrogen and/or metals of groups IIA, IIIA, IVA, IB, IIB, IIIB, IVB, VIB and/or VIII of the Periodic Table of the Elements, in particular for Cu, Ag, Co, Fe, Ni or platinum metals, particularly preferably Pt, Pd, Rh or Ru. Furthermore, the original cations can be exchanged for ammonium ions. Catalytically active forms of zeolite beta may contain, for example, hydrogen, rare earth metals, aluminum metals of groups II and VII of the Periodic Table of the Elements and/or magnesium. Methods for exchanging the original cations are familiar to the person skilled in the art and therefore need not be explained in more detail here. For example, the exchange can be effected with the aid of ion exchange methods, impregnation or physical mixing methods.

According to a further aspect, the present invention relates to the use of diethylenetriamine as a template or cotemplate (i.e. together with other templates) in a method for the preparation of zeolite beta. Particularly preferred here, as mentioned above, is a combination of diethylenetriamine and tetraethylammonium cations and optionally diethylene glycol as template(s).

According to another aspect, the present invention also relates to the zeolite beta obtainable by the method described above. Thus, it was surprisingly found that this has particularly advantageous properties.

Thus, the zeolite beta according to the invention has a particular morphology in which the small primary crystallites have predominantly combined to give larger agglomerates. The characteristic nature of the zeolite beta according to the invention firstly permits better filterability in comparison with the beta zeolites prepared by methods of the prior art.

The better filterability is an important property of the synthesized zeolites, firstly permitting a more rapid and economical synthesis with higher yields and easier isolation from the mother liquor (e.g. by filtration). This advantage is also retained in the further processing steps in which a solid-liquid separation is required, as, for example, in an aqueous ion exchange or a dealumination with dilute mineral acid or a dilute organic acid. According to a preferred embodiment according to the invention, the primary crystallites have a diameter of less than 0.5 μm, preferably less than 0.1 μm, in particular less than 0.05 μm. Preferably more than 50%, preferably more than 75%, in particular more than 90%, of the primary crystallites have intergrown to give agglomerates having a diameter greater than 0.5 μm, preferably greater than 1 μm, in particular greater than 3 μm. The primary crystallite size was determined on the basis of the line width of the reflection at about 22.40 (2 theta), the freshly synthesized zeolite samples which have not been calcined or subjected to ion exchange being used for the X-ray powder diffractometry after filtration from the mother liquor, rinsing with demineralized water to a conductivity of less than 100 μS/cm in the filtrate and drying in the air at 120° C. The X-ray powder diffractometry was carried out by the standard method, as stated, for example, in U.S. Pat. No. 4,554,145, Example 1. The stated values for the agglomerates are the mean dimensions (arithmetic mean of the largest and the smallest dimension, averaged over a multiplicity of agglomerates). These values are determined using an LEO field emission scanning electron microscope (LEO Electron Microscopy Inc., USA) on the basis of powder samples of freshly synthesized zeolite beta which has not been calcined or subjected to ion exchange, after filtration from the mother liquor, rinsing with demineralized water to a conductivity of less than 100 μS/cm in the filtrate and drying in air at 120° C., which zeolite samples had been redispersed beforehand in acetone, treated with ultrasound for 30 seconds and then applied to a carrier (probe current range: from 4 pA to 10 nA). The measurement is effected under 80,000 times magnification. The values could be confirmed under 253,000 times magnification.

The zeolite beta produced according to the invention can be used in general in all areas where zeolite beta according to the prior art is also used. Of particular importance here are the uses as catalyst or catalyst support and as adsorbent, it having been surprisingly found here that the zeolite beta obtained according to the invention has particularly advantageous activities. It is assumed, without the invention being limited to the correctness of this assumption, that the advantageous properties of the zeolite beta obtained according to the invention in comparison with materials of the prior art are based on the particular morphology of the crystallites and open-pore agglomerates, which is permitted by the method according to the invention.

Important examples of a use of zeolite beta in catalysis are conversions of hydrocarbons, in particular catalytic alkylations of aromatics, organic rearrangement reactions, Friedel-Crafts reactions, alkylations and acetylations, isomerizations and hydroisomerizations, in particular of paraffins, generally hydrogenation-dehydrogenation reactions of hydrocarbons, olefin polymerizations or oligomerizations, olefin-to-olefin conversions and methanol-to-propylene conversions.

In the field of use as an adsorbent, the adsorption of hydrocarbons from exhaust gas emissions or $NO_x$ reduction may be mentioned as nonlimiting examples.

Depending on the desired use, the zeolite beta obtained by the method according to the invention can be mixed or further processed with further components. For example, reference may be made here to the disclosure in U.S. Pat. No. 4,554, 145, col. 4, line 60 to column 6, line 28, which is hereby incorporated in the description by reference. Preferred further processings of the zeolites relate to aqueous ion exchange, solid-state ion exchange (as described, for example, in EP 0 955 080 A), dealumination by treatment with dilute mineral acid or a dilute organic acid and by hydrothermal treatment (cf. for example R. Szostak, Studies in Surface Science Catalysis, 137 (2001) 261-297), production of moldings of any desired size and shape by conventional methods, such as extrusion, tabletting or spray drying, optionally with the aid of binders, or coating of moldings, in particular honeycombs, with a suspension of zeolite and binder as so-called washcoat.

The invention is now further illustrated with reference to the nonlimiting examples below.

EXAMPLE 1

Zeolite beta was crystallized in a reaction mixture with the following composition expressed as molar ratios:

0.068 $Na_2O$:0.09 $TEAO_2$:0.24 $(H_2NC_2H_4)_2NH$:0.04 $Al_2O_3$:$SiO_2$:0.18 HBr:12 $H_2O$

The reaction mixture was prepared by dissolving 908.7 g of tetraethylammonium bromide, 641.9 g of diethylenetriamine and 1754.2 g of precipitated silica (Sipernat® 320, Degussa, Germany) in 4576.2 g of water. A second solution consisting of 199.5 g of sodium aluminate and 39.8 g of sodium hydroxide in 807.6 g of water was added to this mixture with stirring. Zeolite beta seed crystals were added to the reaction mixture.

The mass of the seed crystals was 10% by weight of the amount of $SiO_2$ used. The reaction mixture was homogenized for 10 min by vigorous stirring and transferred to a synthesis autoclave (10 l volume). The mixture was heated therein to 150° C. in the course of 12 h and kept at this temperature for a further 129 h. After cooling, the product was filtered off, washed with distilled water and dried at 120° C. The product was checked by X-ray powder diffractometry and zeolite beta was identified as a single phase. The wet chemical analysis gave 0.35% by weight of Na, 3.1% by weight of Al, 35.5% by weight of Si and 13.5% by weight of C.

Filtering off of the synthesized zeolite beta from the mother liquor could be completed in 3 hours using a Büchner filter.

The primary crystallites obtained had a diameter of less than 17 nm and exhibited more than 90% intergrowth to give agglomerates. The average size of the agglomerates, i.e. the D50 value based on the number of particles, was 2.4 μm. The D10 value of the agglomerates, i.e. that value at which 10% of the agglomerates were smaller, was 1.4 μm.

In comparison, over 48 hours was required for filtration from the mother liquor for a zeolite beta (comparison) prepared in a corresponding manner using only tetraethylammonium bromide as a template (with identical total template molarity in the reaction mixture). The zeolite suspension (comparison) was finely divided and the primary crystallites were larger than 0.5 μm and less than 10% thereof had intergrown to give agglomerates.

EXAMPLE 2

Zeolite beta was crystallized in a reaction mixture with the following composition, expressed as molar ratios:

0.04 $Na_2O$:0.05 $TEAO_2$:0.12 $(H_2NC_2H_4)_2NH$:0.022 $Al_2O_3$:$SiO_2$:12 $H_2O$

The reaction mixture was prepared by dissolving 1229.0 g of tetraethylammonium hydroxide solution (35% strength by weight aqueous solution), 361.6 g of diethylenetriamine and 1976.4 g of precipitated silica (Sipernat® 320, Degussa, Germany) in 4486.3 g of water. 175.5 g of template-containing crystallization seeds of the zeolite beta type were added to the reaction mixture. The mass of the seed crystals was 10% by weight of the amount of $SiO_2$ used. A second solution consisting of 124.9 g of sodium aluminate and 30.1 g of sodium hydroxide in 791.7 g of water was added to this mixture with stirring. The reaction mixture was homogenized for 10 min by vigorous stirring and transferred to a synthesis autoclave (10 l volume). The mixture was heated therein to 150° C. in the course of 12 h and kept at this temperature for a further 95 h. The product was filtered off, washed with distilled water and dried at 120° C. The product was checked by X-ray powder diffractometry, and zeolite beta was identified as a single phase. The wet chemical analysis gave 0.9% by weight of Na, 2.0% by weight of Al, 41.3% by weight of Si and 14.7% by weight of C.

The primary crystallites had a diameter of less than 29 nm and more than 90% of them had intergrown to give agglomerates. The average size of the agglomerates, i.e. the D50 value based on the number of particles, was 4.3 μm. The D10 value of the agglomerates, i.e. that value at which 10% of the agglomerates was smaller, was 1.5 μm.

EXAMPLE 3

Calcination

The zeolite beta obtained in Example 1 was heated in a nitrogen stream at 1 K/min to 380° C. and kept at this temperature for 8 h, after which the temperature was increased further to 480° C. at 1 K/min. After the temperature had been reached, oxygen was mixed with the nitrogen stream and the temperature was maintained for a further 16 h.

EXAMPLE 4

Zeolite beta was crystallized in a reaction mixture with the following composition, expressed as molar ratios:

0.068 $Na_2O$ 0.08 $TEAO_2$:0.12 $(H_2NC_2H_4)_2NH$:0.04 $Al_2O_3$:$SiO_2$:0.16 HBr:12 $H_2O$

The reaction mixture was prepared by dissolving 3662.0 g of tetraethylammonium bromide, 1348.3 g of diethylenetriamine and 7319.4 g of precipitated silica (Sipernat® 320, Degussa, Germany) in 18,132.0 g of water. Template-containing crystallization seeds of the zeolite beta type were added to the reaction mixture. The mass of the seed crystals was 10% by weight of the amount of $SiO_2$ used. A second solution consisting of 838.0 g of sodium aluminate and 167.3 g of sodium hydroxide in 2266.5 g of water was then added to this mixture with stirring. The reaction mixture was homogenized for 10 min by vigorous stirring and transferred to a synthesis autoclave (40 l volume). The mixture was heated therein to 150° C. in the course of 12 h and this temperature was maintained for a further 125 h. After cooling, the product was filtered off on a membrane filter press, rinsed with distilled water and dried at 120° C. The product was analyzed by X-ray powder diffractometry and identified as a single-phase zeolite beta.

The primary crystallites had a diameter of less than 19 nm and more than 90% of them had intergrown to give agglomerates. The average size of the agglomerates, i.e. the D50 value based on the number of particles, was 7.0 Mm. The D10 value of the agglomerates, i.e. that value at which 10% of the agglomerates were smaller, was 2.0 μm.

EXAMPLE 5

Zeolite beta was crystallized in a reaction mixture with the following composition, expressed as molar ratios:

0.08 $Na_2O$:0.20 $TEAO_2$:0.107 $(H_2NC_2H_4)_2NH$:0.022 $Al_2O_3$:$SiO_2$:0.40 HBr:12 $H_2O$.

The reaction mixture was prepared by dissolving 1998.6 g of tetraethylammonium bromide, 261.6 g of diethylenetriamine and 1608.6 g of precipitated silica (Sipernat® 320, Degussa, Germany) in 3189.6 g of water. A second solution consisting of 101.6 g of sodium aluminate and 100.6 g of sodium hydroxide in 739.3 g of water was added to this mixture with stirring. Zeolite beta seed crystals were added to the reaction mixture. The mass of the seed crystals was 10% by weight of the amount of $SiO_2$ used. The reaction mixture was homogenized for 10 min by vigorous stirring and transferred to a synthesis autoclave (10 l volume). The mixture was stirred therein for 1.5 h at room temperature and then heated to 150° C. in the course of 12 h and kept at this temperature for a further 38.5 h. After cooling, the product was filtered off, washed with distilled water and dried at 120° C. The product was checked by X-ray powder diffractometry, and zeolite beta was identified as a single phase. The wet chemical analysis gave a composition of 0.33% by weight of Na, 1.7% by weight of Al, 36.4% by weight of Si and 10.7% by weight of C.

The primary crystallites had a diameter of less than 33 nm and more than 90% of them had intergrown to give agglomerates. The average size of the agglomerates, i.e. the D50 value based on the number of particles, was 3.3 μm. The D10 value of the agglomerates, i.e. that value at which 10% of the agglomerates were smaller, was 1.6 μm.

EXAMPLE 6

Zeolite beta was crystallized in a reaction mixture with the following composition, expressed as molar ratios:

0.068 Na$_2$O:0.09 TEAO$_2$:0.08 (H$_2$NC$_2$H$_4$)$_2$NH:0.04 Al$_2$O$_3$:SiO$_2$:0.16 HBr:0.16 (HOC$_2$H$_4$)$_2$O:12 H$_2$O

The reaction mixture was prepared by dissolving 961.2 g of tetraethylammonium bromide, 209.7 g of diethylenetriamine, 598.7 g of diethylene glycol and 1719.3 of precipitated silica (Sipernat® 320, Degussa, Germany) in 4485.0 g of water. Template-containing crystallization seeds of the zeolite beta type were added to the reaction mixture. The mass of the seed crystals was 10% by weight of the amount of SiO$_2$ used. A second solution consisting of 195.5 g of sodium aluminate and 39.0 g of sodium hydroxide in 791.5 g of water was then added to this mixture with stirring. The reaction mixture was homogenized for 10 min by vigorous stirring and transferred to a synthesis autoclave (10 l volume). The mixture was heated therein to 150° C. in the course of 12 h and this temperature was maintained for a further 110 h. After cooling, the product was filtered off on a membrane filter press, rinsed with distilled water and dried at 120° C. The product was analyzed by X-ray powder diffractometry and identified as a single-phase zeolite beta. The wet chemical analysis gave 0.50% by weight of Na, 3.2% by weight of Al, 41.2% by weight of Si and 14.4% by weight of C.

The primary crystallites obtained had a diameter of less than 22 nm and more than 90% of them had intergrown to give agglomerates. The average size of the agglomerates, i.e. the D50 value based on the number of particles, was 4.3 μm. The D10 value of the agglomerates, i.e. that value at which 10% of the agglomerates were smaller, was 1.5 μm.

EXAMPLE 7

Production of the H Form 2310 g of demineralized water were initially introduced into a beaker having a volume of 5 l, and 190.0 g of ammonium nitrate were dissolved therein and 500 g of the calcined zeolite from Example 3 were suspended therein. The suspension was stirred for 2 h at room temperature. Thereafter, the zeolite was filtered off over a Büchner filter and rinsed with distilled water. In a second cycle, the filtercake obtained was suspended again in a solution of 190.0 g of ammonium nitrate in 2310 g of demineralized water and stirred again for 2 h at room temperature.

Thereafter, the zeolite was filtered off over a Büchner filter and rinsed with distilled water. In order to achieve as good a washing effect as possible, the filtercake obtained was suspended once again in 4 l of demineralized water and filtered off again over a Büchner filter. Thereafter, the filtercake was dried for 16 h at 120° C. and calcined for 8 h at 450° C. The wet chemical analysis of the H-beta zeolite obtained gave 0.01% by weight of Na, 3.4% by weight of Al, 42.9% by weight of Si and 0.01% by weight of C.

EXAMPLE 8

Production of the Fe Form 2400 g of demineralized water were initially introduced into a beaker having a volume of 5 l and 31.6 g of iron (II) sulfate were dissolved therein and 500 g of the calcined zeolite from Example 3 were suspended therein. The pH of the suspension was 3.14. The suspension was stirred for 2 h at room temperature. Thereafter, the zeolite was filtered off over a Büchner filter and rinsed with distilled water. In order to achieve as good a washing effect as possible, the filtercake obtained was suspended once again in 4 l of demineralized water and filtered off again over a Büchner filter. Thereafter, the filtercake was dried for 16 h at 120° C. and calcined for 8 h at 350° C.

The wet chemical analysis gave 0.08% by weight of Na, 3.4% by weight of Al, 43.1% by weight of Si and 1.1% by weight of Fe.

The invention claimed is:

1. A method for the preparation of zeolite beta the comprising reacting a reaction mixture comprising a template and other components in order to form the zeolite beta, wherein the template used comprises diethylenetriamine.

2. The method as claimed in claim 1, characterized in that the template used comprises diethylenetriamine and tetraethylammonium cations.

3. The method as claimed in claim 1, characterized in that the template substantially or completely consists of diethylenetriamine and at least one compound containing tetraethylammonium cations.

4. The method as claimed in claim 3, characterized in that the reaction mixture has a composition, expressed as molar ratios, in the following ranges:

| | |
|---|---|
| SiO$_2$/Al$_2$O$_3$ | from 10 to 400 |
| M$_2$O/SiO$_2$ | from 0.001 to 0.1 |
| R$_2$O/SiO$_2$ | from 0.04 to 0.5 |
| R'/SiO$_2$ | from 0.05 to 1 |
| H$_2$O/SiO$_2$ | from 8 to 300 | in which R is a tetraethylammonium salt, R' is diethylenetriamine and M is an alkali metal ion.

5. The method as claimed in claim 4, characterized in that R' is a salt with a general empirical formula selected from R'X, R'X$_2$ and/or R'X$_3$.

6. The method as claimed in claim 5, wherein R' comprises a halide.

7. The method as claimed in claim 6, wherein the halide comprises a bromide.

8. The method as claimed in claim 4, characterized in that R comprises tetraethylammonium bromide and M comprises sodium.

9. The method as claimed in claim 4, characterized in that M and/or R and/or R' are exchanged completely or partly for hydrogen and/or metals of groups IIA, IIIA, IVA, IB, IIB, IIIB, IVB, VIB, and/or VIII of the Periodic Table of the Elements.

10. The method as claimed in claim 9, wherein M and/or R and/or R' are exchanged with a metal selected from Cu, Ag, Co, Fe, Ni, platinum metals, and mixtures thereof.

11. The method as claimed in claim 10, wherein M and/or R and/or R' are exchanged with a metal selected from Pt, Pd, Rh, Ru, and mixtures thereof.

12. The method as claimed in claim 4, wherein the tetraethylammonium salt comprises a halide and/or hydroxide.

13. The method as claimed in claim 3, characterized in that the reaction mixture has the following composition, expressed as molar ratios:

| | |
|---|---|
| SiO$_2$/Al$_2$O$_3$ | from 20 to 50 |
| M$_2$O/SiO$_2$ | from 0.01 to 0.08 |
| R$_2$O/SiO$_2$ | from 0.06 to 0.4 |
| R'/SiO$_2$ | from 0.1 to 0.5 |
| H$_2$O/SiO$_2$ | from 10 to 50 | in which R is a tetraethylammonium salt, R' is diethylenetriamine and M is an alkali metal ion.

14. The method as claimed in claim 3, characterized in that the template further comprises diethylene glycol.

15. The method as claimed in claim 1, characterized in that the reaction mixture is kept at a temperature of from 100 to 180° C. until crystals of zeolite beta have formed, and then the zeolite crystals obtained are separated off.

16. The method as claimed in claim 1 further comprising adding seed crystals of zeolite beta to the reaction mixture to promote the formation of further crystals of zeolite beta.

* * * * *